Patented June 30, 1936

2,045,702

UNITED STATES PATENT OFFICE 2,045,702

PRODUCTION OF HORMONE COMPOUNDS

Wilhelm Dirscherl, Heidelberg, Germany

No Drawing. Application September 28, 1934, Serial No. 745,948. In Great Britain October 6, 1933

9 Claims. (Cl. 260—153)

My invention relates to hormone products and more especially to products obtained by hydrogenation of the follicle hormone or an acyl derivative thereof. It is an object of my invention to provide means whereby the dihydrofollicle hormone can be obtained with a higher yield and in greater purity than was hitherto possible.

As is well known to those skilled in the art the female hormones have repeatedly been subjected to a hydrogenation treatment.

Danielli, Marrian and Haslewood (Biochemical Journal, 1933, vol. 27, p. 319), when subjecting the follicle hormone to catalytic hydrogenation in alcoholic solution and in the presence of platinum oxide under a hydrogen pressure of 4 atmospheres, obtained a product melting at 174 to 176° C., the yield being about 50%, and an octahydro product melting at 208 to 210° C., whose yield amounted to a few per cent.

At about the same time Schwenk and Hildebrandt (Naturwissenschaften 1933, vol. 21, p. 177) published the fact that, without giving particulars, they had succeeded in obtaining from the follicle hormone two dihydro products, one melting at 168 to 170° C., the other at 198 to 204° C.

Shortly thereafter Girard, Sandulesco and Fridenson (Comptes rendus des Séances de la Société de Biologie 1933, vol. 112, p. 964) described a dihydrofolliculine which they produced from follicle hormone by treating same with sodium in alcohol or by subjecting it to catalytic hydrogenation in the presence of a nickel catalyst, this compound melting at 174 to 175° C.

Apparently only the French authors obtained a uniform product, but their publication does not contain any statement regarding the yield.

I have now ascertained by a great number of experiments that the hydrogenation of the follicle hormone with sodium and alcohol, even if sodium is present in large excess of the calculated quantity, is very little satisfactory, since one mainly obtains a mixture, to be separated only with difficulty, of dihydrofollicle hormone and unconverted follicle hormone. On the other hand I have tried a great variety of nickel catalysts, without being able to obtain a dihydro product and I presume that a successful hydrogenation with a nickel catalyst is only possible, if a well defined catalyst is used, the nature and mode of production of which has however not been described by the French authors.

I have now found that it is possible to produce the dihydrofollicle hormone melting at about 170° C. with practically quantitative yield, if the follicle hormone is subjected to hydrogenation in alkaline solution with platinum oxide or platinum metal as catalyst, however—in contradistinction to Marrian and his collaborators—not under increased pressure, but at normal or substantially normal pressure, i. e. under a slight pressure above normal, such as is customary when carrying through a catalytic hydrogenation reaction. After separation from the catalyst and acidylation, the dihydro product melting at 170 to 175° C. frequently separates out in pure crystalline form, but if desired it may be recrystallized once or several times. The reaction may also be carried through in a neutral, for instance in an alcoholic medium and also in this case a high yield of the product melting at 170 to 175° C. can be obtained by recrystallization.

Instead of the follicle hormone itself, I may use with equal advantage any other follicle hormone product containing a free carbonyl group and at least three double bonds, for instance benzoylfollicle hormone. In the course of the reaction the acid group is split off and the free dihydrofollicle hormone is formed.

Instead of starting from crystallized hormone products, I may also start from extracts containing follicle hormone, no matter what may be their state of purity and concentration.

Apart from the high yield the new process is favorably distinguished by the fact that the products obtained are free from by-products present in the hydrogenation products hitherto obtained.

I have further ascertained to my surprise that the product melting at about 174° C., which appeared to be homogeneous, is in fact inhomogeneous inasmuch as it contains a substance possessing an unmistakable male action. Hitherto such action had been assumed, and to a certain extent also ascertained, only in the case of products of a higher degree of hydrogenation (Naturwissenschaften 1933, vol. 21, p. 286). By physical or chemical methods, more especially by fractional extraction, fractional distillation in a high vacuum, precipitation or adsorption, the percentage of the substance having a male action can be concentrated and by repeating or combining such methods it may be finally separated from the substance exerting a female action. I have for instance found it useful to subject an aqueous suspension of the product melting at 174° C. to fractional extraction with benzene in which the substance having a male activity is less soluble. The separation of the hydrogenation product into its constituents of male and female activity and the state of purity of these products are preferably controlled by the physiological test.

In practising my invention I may for instance proceed as follows:—

Example 1

200 milligrams follicle hormone are dissolved in 80 cubic centimetres of a 2-normal caustic soda solution. After cooling platinum oxide is added and the solution shaken at room temperature under the addition of hydrogen, until the substance has taken up 2 hydrogen atoms. The catalyst is now separated by filtration, well rinsed with water and the different liquors are mixed and acidylated with hydrochloric acid. In order to isolate the hydrogenation product the product of reaction is either filtered off and recrystallized directly from its suspension or it is extracted by shaking with benzene. On concentrating the dried benzene solution one obtains the dihydrofollicle hormone as a finely crystallized mass, the yield being 90 to 95%. The substance, which melts at 174 to 175° C., is soluble in alkali and does not form an oxim. The analysis showed it to contain 79.27% C. and 8.94% H, while the dihydrofollicle hormone $C_{18}H_{24}O_2$, according to calculation, contains 79.4% C. and 8.9% H. By fractional extraction of the suspension with benzene, as above described, a hormone showing female activity and a hormone showing male activity may be obtained. The male hormone is found to be highly active in the mouse test as well as in the cockscomb test.

Example 2

100 milligrams follicle hormone are dissolved in 40 cubic centimetres 2-normal caustic soda solution and shaken at 60° C. with platinum oxide and hydrogen. Here the calculated quantity of hydrogen is taken up in far less time (about 1 to 2 hours) than at room temperature. The solution is treated further as described with reference to Example 1 and the yield of dihydrofollicle hormone is substantially the same.

Example 3

100 milligrams follicle hormone are dissolved in 50 cubic centimetres absolute alcohol and shaken at ordinary temperature in the presence of platinum oxide and under addition of hydrogen. The purity of the crude dihydro product to be formed can be increased, if the shaking and eventually also the addition of hydrogen is continued for some time after the calculated quantity of hydrogen has been absorbed. The catalyst is now separated by filtration and the solution evaporated to dryness in vacuo. The glass-like residue crystallizes after some time, more especially if triturated with the glass rod, in fine roses. The hydrogenation product is obtained in quantitative yield; it melts between 165 and 170° C. and after recrystallization from a mixture of alcohol at 174 to 175° C.

Example 4

100 milligrams follicle hormone are dissolved in 50 cubic centimetres absolute alcohol and the solution is shaken in the presence of hydrogen with platinum oxide at 65 to 70° C. After the calculated quantity of hydrogen has been absorbed, the solution is filtered and concentrated in vacuo. By adding water to the hot solution and subsequent cooling one obtains the dihydrofollicle hormone in fine crystals. The yield is 95 milligrams.

Example 5

Platinum oxide is shaken with hydrogen at ordinary temperature in 20 cubic centimetres absolute alcohol. After the oxide has been reduced, 100 milligrams follicle hormone dissolved in 20 cubic centimetres alcohol are added. The solution is now subjected to hydrogenation until 2 atoms hydrogen have been taken up. The further treatment is effected as described with reference to the preceding examples. The yield is almost quantitative.

Example 6

50 milligrams benzoyl follicle hormone are dissolved in 25 cubic centimetres absolute alcohol and shaken with platinum oxide at room temperature under the introduction of hydrogen, until the absorption of hydrogen has come to an end. The filtered solution is now evaporated to dryness in vacuo and the reaction product recrystallized from dilute alcohol or the dry residue is dissolved in benzene, the solution is extracted with 0.5 normal caustic soda solution, whereafter some benzoyl follicle hormone may remain over in the benzene and the alkaline solution is acidylated. The dihydrofollicle hormone which now precipitates, is recrystallized from benzene or from dilute alcohol. One thus obtains 35 milligrams dihydrofollicle hormone melting at 170 to 174° C.

Example 7

Urine of mares is strongly acidulated with a mineral acid, heated during some time and thereafter extracted with benzene. The residue obtained after evaporation is dissolved in alcohol, platinum oxide is added and the solution is shaken in a current of hydrogen. When the hydrogenation has come to and end, the catalyst is separated by filtration and the solution is distilled with steam. The residual matter is shaken with benzene and the solution thus obtained is extracted repeatedly with soda solution, thereafter with a dilute caustic soda solution. The alkaline extracts are mixed and acidulated, the precipitate is separated by filtration and recrystallized. The dihydrofollicle hormone thus obtained in a very good yield may for instance be purified by recrystallization and decomposed, by fractional extraction or precipitation, into a fraction possessing a vigorous female action and another fraction showing a vigorous male effect.

Various changes may be made in the details disclosed in the foregoing specification without departing from the invention or sacrificing the advantages thereof.

I claim:—

1. The method of producing dihydrofollicle hormone comprising subjecting a follicle hormone product containing a free carbonyl group and at least three double bonds to the action of hydrogen in a non-acid medium in the presence of a catalyst containing platinum under substantially normal hydrogen pressure.

2. The method of producing dihydrofollicle hormone comprising subjecting a follicle hormone product containing a free carbonyl group and at least three double bonds to the action of hydrogen in an alkaline medium in the presence of a catalyst containing platinum under substantially normal hydrogen pressure.

3. The method of producing dihydrofollicle hormone comprising subjecting a follicle hormone product containing a free carbonyl group and at least three double bonds to the action of hydrogen in caustic soda solution in the presence of a catalyst containing platinum under substantially normal hydrogen pressure.

4. The method of producing dihydrofollicle hormone comprising subjecting a follicle hormone product containing a free carbonyl group and at least three double bonds to the action of hydrogen in alcoholic solution in the presence of a catalyst containing platinum under substantially normal hydrogen pressure.

5. The method of producing dihydrofollicle hormone comprising subjecting a follicle hormone product containing a free carbonyl group and at least three double bonds in a non-acid medium in the presence of platinum oxide as catalyst under substantially normal hydrogen pressure.

6. The method of producing dihydrofollicle hormone comprising subjecting an acylderivative of a follicle hormone product containing a free carbonyl group and at least three double bonds to the action of hydrogen in a non-acid medium in the presence of a catalyst containing platinum under substantially normal hydrogen pressure.

7. The method of producing dihydrofollicle hormone comprising subjecting a follicle hormone product containing a free carbonyl group and at least three double bonds to the action of hydrogen in a nonacid medium in the presence of a catalyst containing platinum under substantially normal hydrogen pressure until the hormone product has taken up two hydrogen atoms.

8. The method of producing dihydrofollicle hormone comprising subjecting a follicle hormone product containing a free carbonyl group and at least three double bonds to the action of hydrogen in a non-acid medium in the presence of a catalyst containing platinum under substantially normal hydrogen pressure, until the hormone product has taken up two hydrogen atoms, and treating the hydrogenation product by fractional extraction with a solvent.

9. The method of producing dihydrofollicle hormone comprising subjecting a follicle hormone product containing a free carbonyl group and at least three double bonds to the action of hydrogen in a non-acid medium in the presence of a catalyst containing platinum under substantially normal hydrogen pressure, until the hormone product has taken up two hydrogen atoms, and treating the hydrogenation product with an adsorption agent.

WILHELM DIRSCHERL.